(12) United States Patent
Odegard et al.

(10) Patent No.: US 6,564,340 B1
(45) Date of Patent: May 13, 2003

(54) FAULT TOLERANT VIRTUAL VMEBUS BACKPLANE DESIGN

(75) Inventors: Thomas A. Odegard, Albuquerque, NM (US); Larry J. Thomas, Albuquerque, NM (US); Bryan P. Hansen, Albuquerque, NM (US); Aaron Levine, Rio Rancho, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/442,702

(22) Filed: Nov. 18, 1999

(51) Int. Cl.⁷ .......................... G06F 13/40; G06F 11/20
(52) U.S. Cl. .............. 714/43; 714/5; 710/316
(58) Field of Search ............ 714/5, 8, 43, 13; 716/300, 312, 316; 710/300, 312, 316

(56) References Cited

U.S. PATENT DOCUMENTS

| | | | |
|---|---|---|---|
| 5,345,566 A | * | 9/1994 | Tanji et al. ................ 710/306 |
| 5,815,647 A | * | 9/1998 | Buckland et al. ........... 710/104 |
| 6,052,753 A | * | 4/2000 | Doerenberg et al. ......... 710/29 |
| 6,076,142 A | * | 6/2000 | Corrington et al. ......... 710/306 |

FOREIGN PATENT DOCUMENTS

WO    WO 97/32252    2/1997    .......... G06F/11/30

OTHER PUBLICATIONS

Strass, Hermann; "Verteilte Rechenaufgaben", p. 96–100; *Electronik* Jun. 1999.

* cited by examiner

Primary Examiner—Scott Baderman
Assistant Examiner—Joshua A Lohn (57) ABSTRACT

This invention provides fault tolerant capability for a Versa Module Eurocards backplane system design for high reliability applications. An approach of connecting two independent backplanes together electrically, but providing isolation capabilities in the event of a failure was developed. The electrical connection or integrated bridge design provides a virtual connection between the two VME backplanes that is transparent to the end user. The integrated virtual VMEbus design provides a low latency, high bandwidth interconnect between modules whether located on the same local bus or the electrically isolateable bus. This dual-VME fault tolerant backplane design eliminates complete system failures due to single event failures.

22 Claims, 10 Drawing Sheets

FAULT TOLERANT VIRTUAL VMEBUS BACKPLANE DESIGN

BACKGROUND OF THE INVENTION

The invention relates to Versa Module Eurocards (VME) backplanes and more particularly to connecting two independent VME backplanes together electrically but providing isolation in the event of a failure.

Recent shifts in the military market has driven system architectures from point-designs to commercial based technology designs. The military market has particularly focused its attention on VME-based technology for future system designs. VME backplane technology has problems in certain military applications, in particular fault tolerant designs for avionics applications. The VME backplane is very susceptible to single point failures. Currently available methods to provide fault tolerant designs using VME technology significantly degrade or compromise overall system performance.

Some of the approaches in the past are:

A device manufactured by CES, including a 10MB/s VME-to-VMEbus bridge that provides data transfer between two VME systems. The problem with this approach is one cannot directly address other system modules. Additionally, this system does not provide a direct connected system with fault-tolerant capability. Both sides must be capable of acting as independent systems as well as one virtual system.

Another is a device manufactured by General Standards including a high speed DMA card—bridge between two VME systems. This system is deficient because it cannot directly address other system modules and does not provide a direct connected system with fault-tolerant capability. Again, both sides must be capable of acting as independent systems as well as one virtual system.

Yet another system is manufactured by SBS Bit3 called the MODEL 418 & 418-50. SBS Bit 3's Model 418 and 418-50 are high-performance repeaters for VMEbus systems. A SBS Bit 3 repeater extends a VMEbus backplane from one chassis to a second VMEbus chassis. Both chassis operate as one unit, controlled by the system controller in the primary chassis. The primary chassis can operate as a stand-alone system; it does not require the secondary chassis. The secondary chassis does not have a system controller; consequently, it cannot operate without the primary chassis. This system is unacceptable because it does not provide a direct connected system with fault-tolerant capability. Again, both sides must be capable of acting as independent systems as well as one virtual system.

Finally, an available product is manufactured by VMIC. The product is called Multimaster which allows multiple VMEbus masters in all chassis software. In the transparent mode the system allows direct communication from primary chassis to secondary chassis with no software overhead (unidirectional link control with bidirectional data transfers). In the nontransparent mode, single cycle or burst access across the link is selected by software program-controlled interrupts which allow each chassis to interrupt the other chassis. The system supports up to 25-foot cables and allows expansion to multiple VMEbus systems in a star configuration. It has switch-controlled isolation for maintenance and software-controlled Isolation. It is memory protected by user-selectable access window. Any address window in one chassis can be mapped to any window in the other chassis (e.g., extended supervisory to short nonprivileged). Window sizes are jumper selected from 256 byte to 16 Mbyte (power of two sizes, i.e., 256, 512, 1 K, 2 K, etc.). The product is compliant to VMEbus Rev. C.1 and supports 8-, 16-, and 32-bit Transfers (bidirectional), supports 16-, 24-, and 32-bit addressing (bidirectional), has two boards and two cables (in a variety of cable lengths), form a VME-to-VME link with automatic detection of remote chassis power up and supports multiple links to the same chassis. The system repeats D0 to D31, A1 to A23, LWORD*, AS*, DS0*, DS1*, AM0 to AM5, DTACK*, and BERR*. The problems with this device are it does not provide a direct connected system with fault-tolerant capability and both sides are not capable of acting as independent systems as well as one virtual system.

Therefore, bridge designs that couple two independent VME systems together currently exist in the VME art. None of the current designs available, however, provide a virtual VMEbus design. Instead, both systems are treated as independent systems with a common data area for passing information between systems. The present invention with an integrated virtual VMEbus bridge operates as one VMEbus backplane.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

A preferred fault tolerant virtual VMEbus backplane for computer systems comprise at least two VMEbus backplanes, each VMEbus backplane comprising a power supply and a fault detection apparatus and at least two bridge modules, each bridge module comprising a switch for connecting and disconnecting each of the VMEbus backplanes. A preferred at least two VMEbus backplanes comprise a monolithic structure. A preferred fault detection apparatus comprises a fail discrete in each bridge module. The fault detection apparatus can also comprise fail discretes in pre-selected modules connected to each VMEbus backplane. The fault detection apparatus preferably comprises a fault detection apparatus in each VMEbus backplane and a transmitter for transmitting the fault signal to a next VMEbus backplane. The faults comprise module fail discretes and VMEbus backplane communication tests. The preferred VMEbus backplane communication tests comprise a data transfer bus test, an arbitration bus test, and a priority interrupt bus test. The bridge modules preferably comprise a structure to connect the VMEbus backplanes to appear as a single VMEbus backplane. The structure to connect the VMEbus backplanes to appear as a single VMEbus backplane comprises direct connections between the at least two VMEbus backplanes. The preferred apparatus further comprises structure to minimize data transmission latency delays between the at least two VMEbus backplanes. The preferred structure to minimize data transmission latency delays between the at least two VMEbus backplanes comprises a direct connection between the at least two VMEbus backplanes.

The preferred method of interconnecting and disconnecting at least two computer systems, a first computer system comprising a first VMEbus backplane and a next computer system comprising a next VMEbus backplane comprises the steps of detecting a fault status in the first and the next computer system, transmitting the fault status to the other computer system, connecting the first VMEbus backplane to the next VMEbus backplane if no faults are detected, disconnecting the first VMEbus backplane from the next VMEbus backplane if a fault is detected, operating in primary mode if the fault is detected in the next VMEbus backplane, and operating in fail safe mode if the fault is detected in the first VMEbus backplane. The steps of transmitting fault status to the other computer system and connecting the first VMEbus backplane to the next VMEbus backplane if no faults are detected comprise setting fail discretes to be detected by the other computer system before connecting the first VMBbus backplane to the next VMEbus backplane. The method further comprises the step of minimizing data transmission latency delays between the first computer system and the next computer system.

The method of interconnecting a first VMEbus backplane and a second VMEbus backplane in a computer system wherein the first VMEbus backplane is connected to a primary bridge and the second VMEbus backplane is connected to a secondary bridge comprises the steps of testing the first VMEbus backplane and the second VMEbus backplane for faults, transmitting a fault/ready signal from the primary bridge and the secondary bridge, if the primary and secondary bridge both transmit the ready signal, connecting the first VMEbus backplane to the secondary VMEbus backplane and operating in a normal mode, if the fault signal is transmitted from the primary bridge and the secondary bridge, isolating the first VMEbus backplane from the secondary VMEbus backplane and operating in a degraded mode, and repeating the aforementioned steps. The step of testing the first VMEbus backplane and the second VMEbus backplane for faults comprises initiating self tests upon power-up. The step of testing the first VMEbus backplane and the second VMEbus backplane for faults comprises testing in the primary bridge and the secondary bridge. The step of connecting the first VMEbus backplane to the secondary VMEbus backplane further comprises the step of configuring the first VMEbus backplane as a system controller and configuring the second VMEbus as a non-system controller. The step of connecting the first VMEbus backplane to the secondary VMEbus backplane comprises connecting the first VMEbus backplane to the secondary VMEbus backplane with one-for-one connections. The preferred step connecting the first VME bus backplane to the secondary VMEbus backplane with one-for-one connections comprises connecting the first VMEbus backplane to the secondary VMEbus backplane so they appear as a single VMEbus backplane. The preferred step of isolating the first VMEbus backplane from the secondary VMEbus backplane and operating in a degraded mode further comprises making the second VMEbus backplane the system controller if the fault signal is transmitted by the primary bridge. The steps of connecting the first VMEbus backplane to the secondary VMEbus backplane and isolating the first VMEbus backplane from the secondary VMEbus backplane comprise decision making logic resident in the primary bridge and the secondary bridge.

An object of the present invention is to provide a fault tolerant capability for a VME backplane.

Another object of the present invention is to provide a virtual bridge connection between two VME backplanes.

Yet another object of the present invention is to provide a fault tolerant VME bridge design that does not degrade or compromise overall system performance.

One advantage of the present invention is that it is transparent to the user and operates like a single VMEbus backplane.

Another advantage of the present invention is that it provides low latency high bandwidth data transfers.

Another advantage of the present invention is its versatility in that the system can be configured in a variety of ways.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 5 (5A–5C) are flow charts showing the bridge switch control logic with

DETAILED DESCRIPTION OF THE INVENTION

Figure 1:
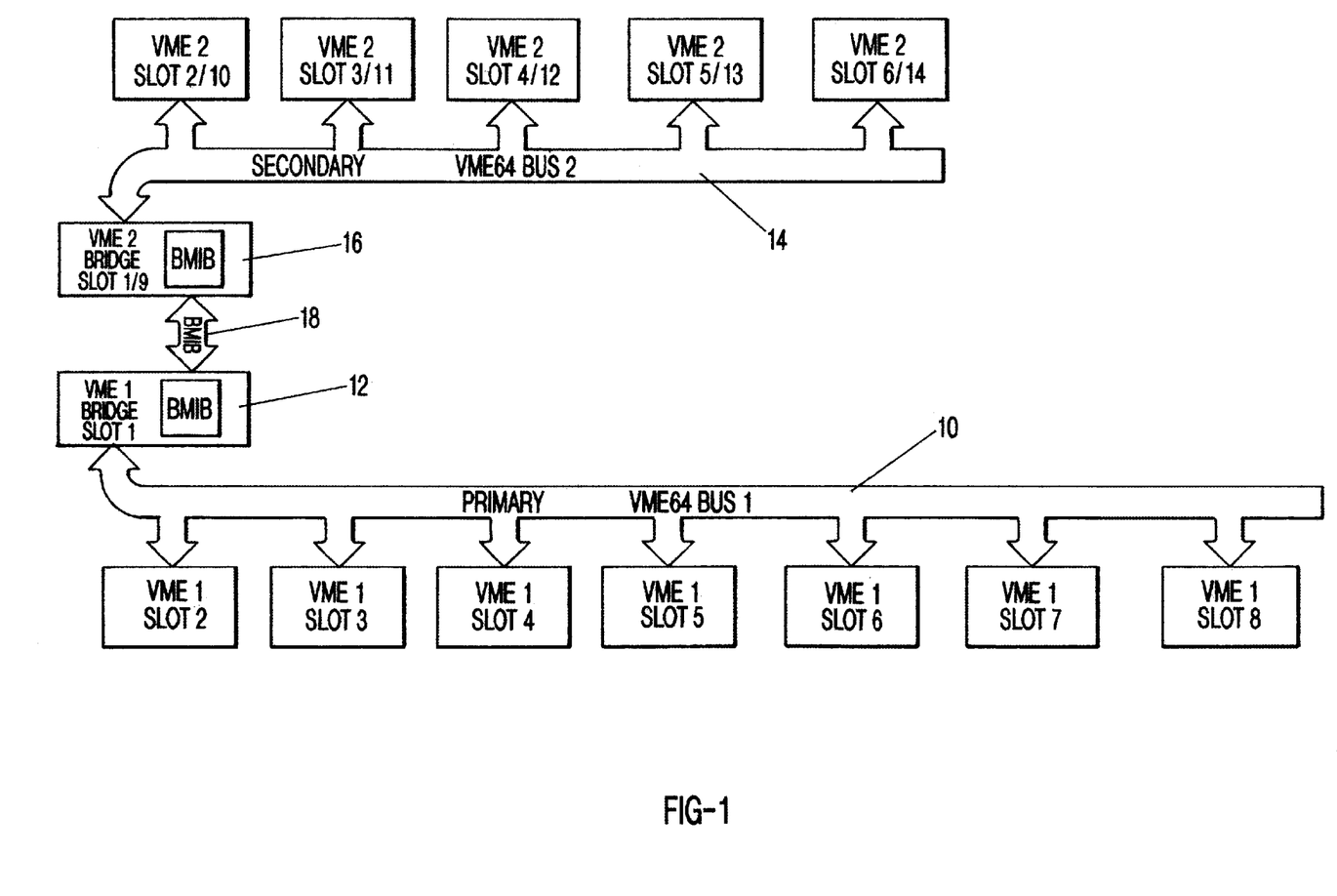
FIG. 1 is a block diagram of the top level of the fault-tolerant backplane in accordance with the present invention.

Referring to FIG. 1, the fault-tolerant VMEbus backplane includes two or more independent backplanes that are electrically connected by bridge module(s) between each backplane. In FIG. 1, the system includes two independent VMEbus backplanes 10 and 14. The primary VMEbus backplane 10 is represented on the bottom of the diagram while the secondary VMEbus backplane 14 is on the top of the diagram. Each backplane contains a bridge module for interconnecting the VMEbus backplanes. Primary backplane 10 contains primary bridge module 12. Primary bridge module 12 is physically and electrically connected to primary backplane 10. Secondary backplane 14 contains a functionally identical secondary bridge module 16. Secondary bridge module 16 is physically and electrically connected to secondary backplane 14. The two bridge modules (primary bridge module 12 and secondary bridge module 16) are directly connected via interconnect bus (IB) 18. Interconnect bus 18 can be directly coupled to local VMEbus backplanes 10 or 14 via a set of switches 20 and 22 (FIG. 4), transceivers, or other interconnect mechanisms (not shown). The bridge modules 12 and 16 for each VMEbus backplane reside in slot 1 of their respective VMEbus backplanes 10 or 14, and are the system controller for their VMEbus backplane per the VMEbus backplane specification (American National Standard for VME64 ANSI/VITA 1-1994).

Figure 2:
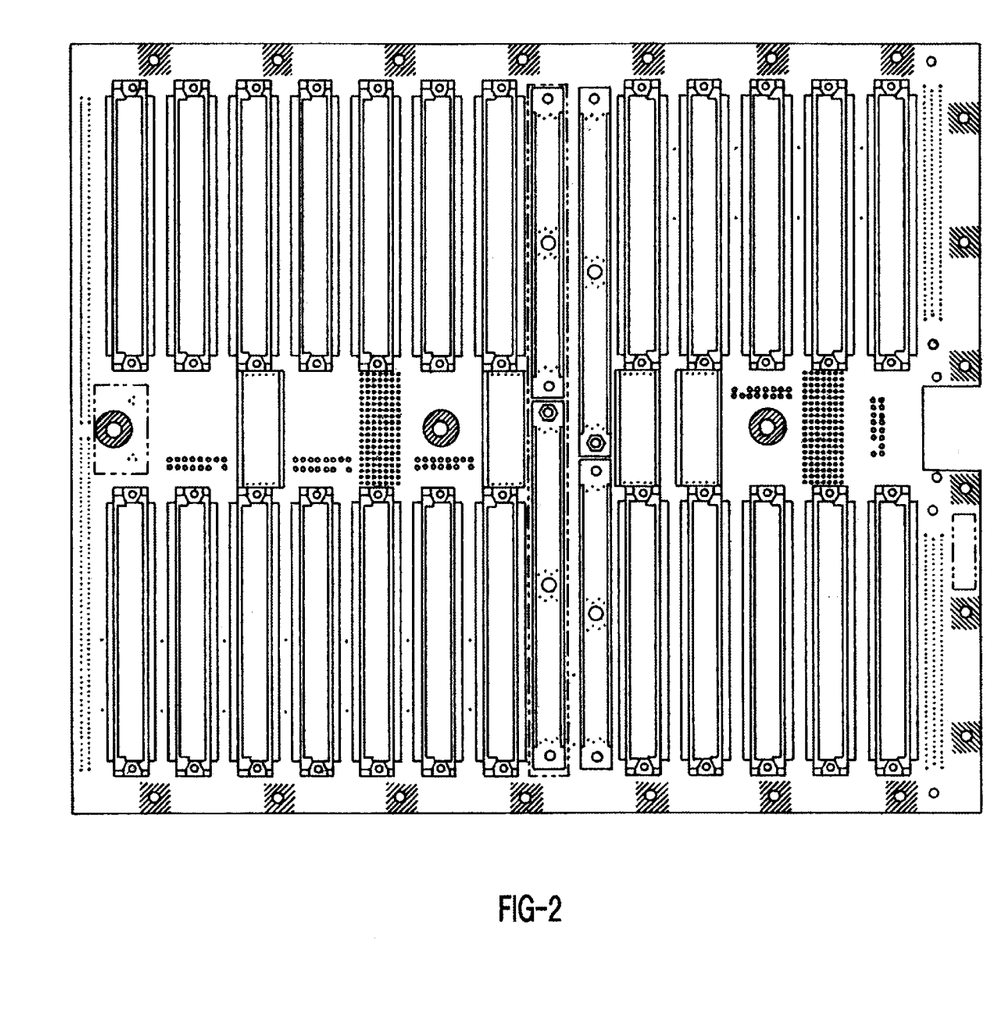
FIG. 2 is a drawing of the top backplane board outline in accordance with the present invention.
Figure 3:
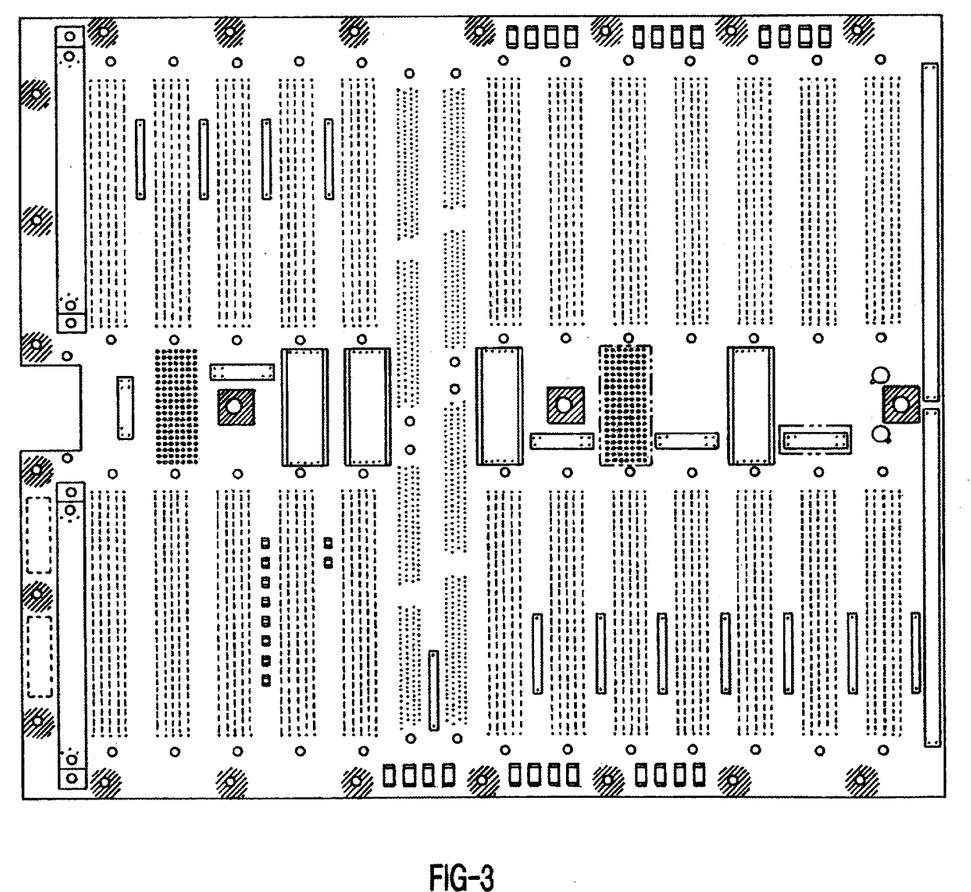
FIG. 3 is a drawing of the bottom backplane board outline in accordance with the present invention.

The physical design for the fault-tolerant virtual bus backplane can be either a monolithic design in which both VMEbusses as well as the interconnect bus are located on one PWB substrate or can be physically separate backplanes with an interconnect harness between them (not shown). For the purpose of this discussion only the monolithic backplane design will be discussed. FIG. 2 shows the top view and FIG. 3 shows the bottom of a 14-slot monolithic backplane design. The maximum number of allowable slots is limited to 21-slots per the VME standard. These slots can be split among two or more backplanes with a bridge module taking up one slot per backplane.

Figure 4:
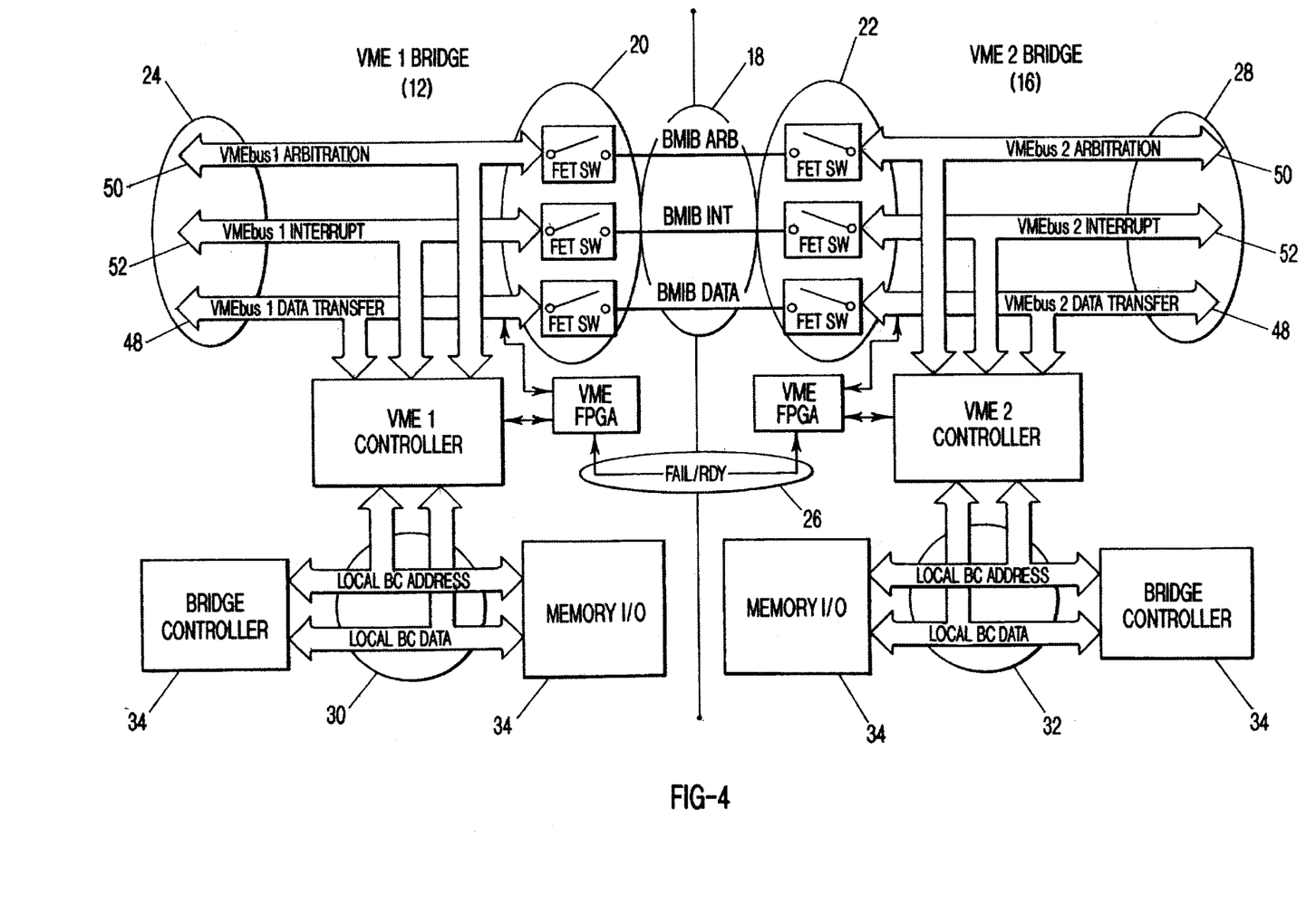
FIG. 4 is a block diagram of the bridge module in accordance with the present invention.

Bridge modules 12 and 16 provide the logic and/or control for determining fault conditions on local VMEbus 10 or 14 and/or bridge interconnect bus 18. A detailed block diagram of the preferred bridge module (16 and 14) is shown in FIG. 4. Each bridge module 12 and 16 includes three busses; local VMEbus backplanes 10 and 14, local bridge bus 30 and 32, and bridge interconnect bus 18. For the purpose of this discussion only, local VMEbus 10 and 14 and bridge interconnect bus 18 are of relevance. Local bridge busses 30 and 32 provide a means of installing, processing, memory, and/or I/O 34 on bridge module 12 and 16 itself. The decision-making logic for connecting the busses and/or fault detection does not need to be resident on the bridge module itself (not shown). Other intelligent modules on local VMEbus 10 and 14 could and can accomplish this task as well. For the purpose of this discussion it will be assumed that each bridge module 12 and 16 contain all the necessary decision-making logic for interconnecting two backplanes 10 and 14. Initial handshaking is provided between two bridge modules 12 and 16 in the form of a Fail and Ready discretes 26. The fail/ready discretes 26 also provide a means to communicate fault conditions in event of a bus failure.

Figure 5A:
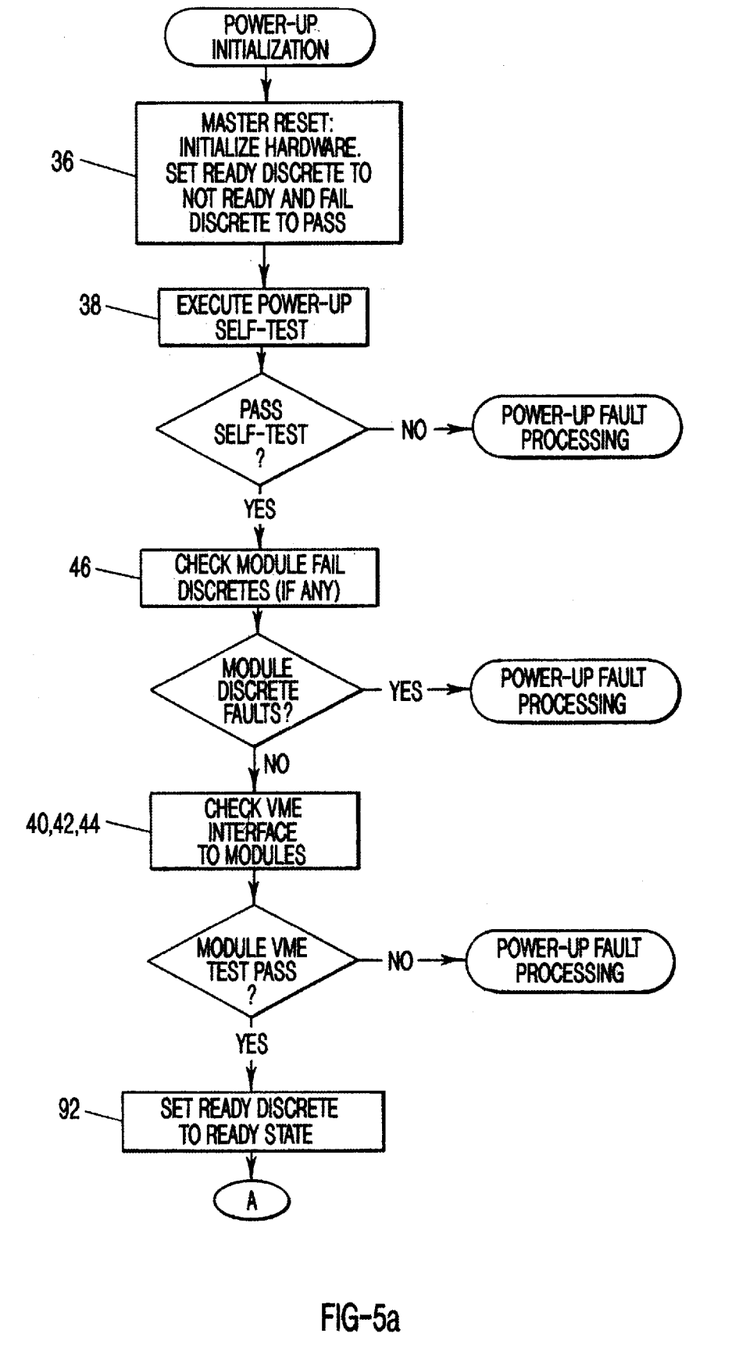
FIG. 5A showing the initialization and power up test in accordance with the present invention.
Figure 5B:
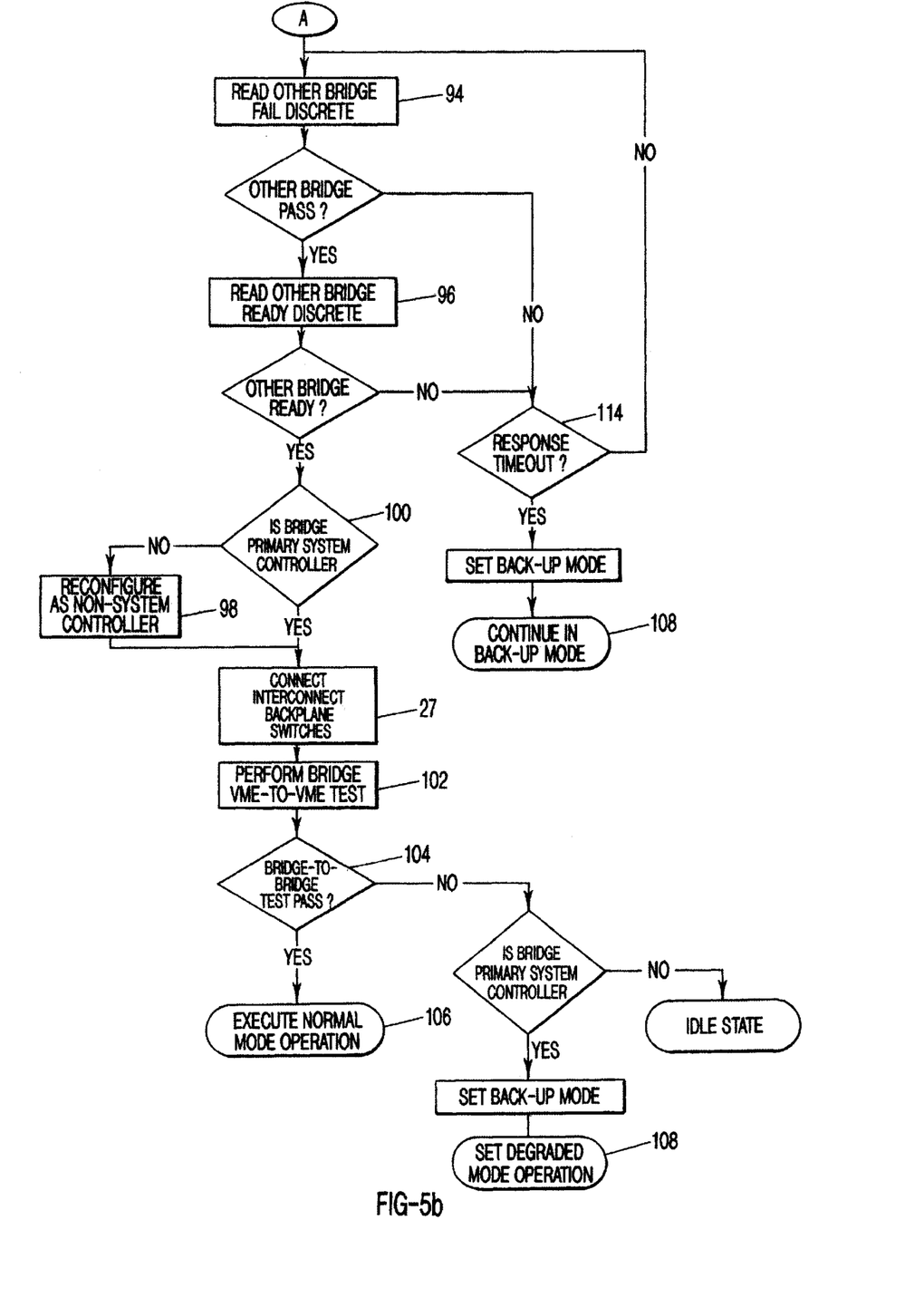
FIG. 5B showing the backplane interconnect logic in accordance with the present invention.
Figure 5C:
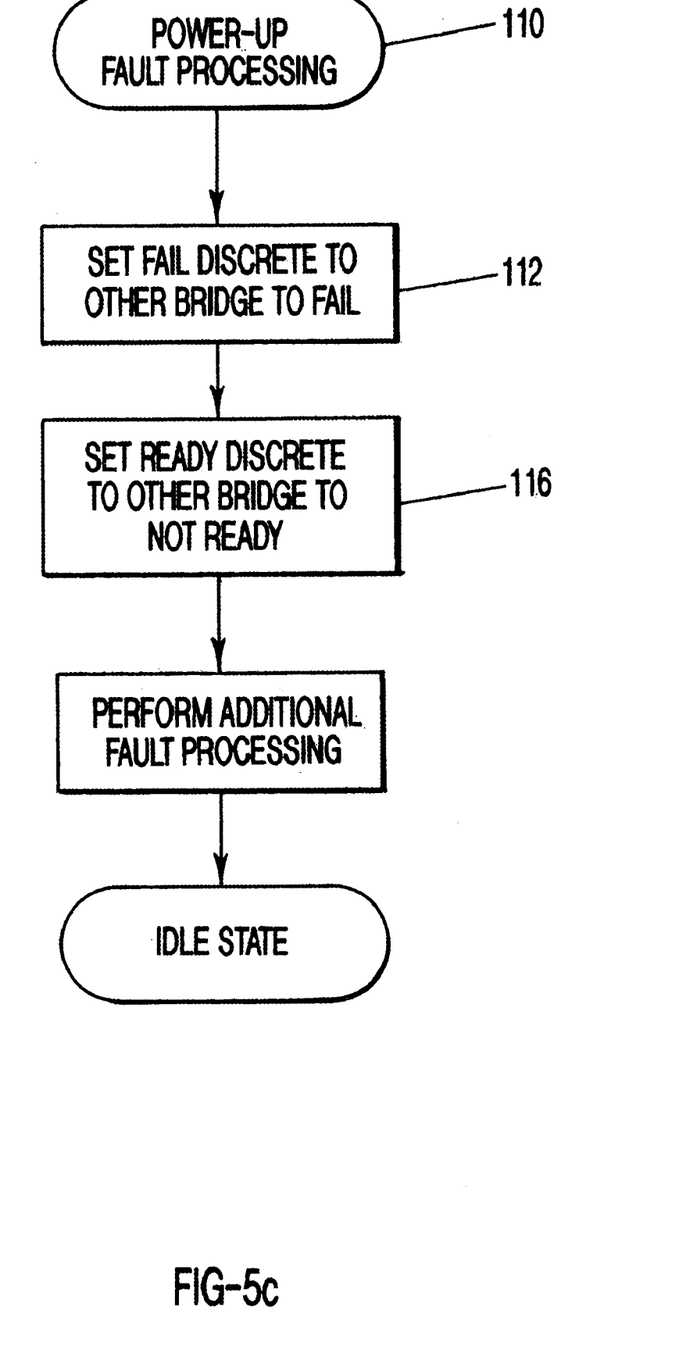
FIG. 5C showing the fault processing in accordance with the present invention.

The flow diagrams shown in FIGS. 5A, 5B, and 5C, illustrate the logic used for initialization, test, and backplane interconnect. On power-up, the bridge module is responsible for directing system initialization 36 at a backplane level (individual modules are responsible for their own initialization). These responsibilities include power-up self-test 38 of the system including backplane read/write tests 40, bus arbitration test 42, interrupt arbitration tests 44, and discrete fail tests 46. After completion of system and module level self-tests, each bridge 12 and 16 will set their respective fail and ready discretes 26 and 92. If either bridge module fails power-up self-test 39, then, the failed bridge module will enter a power-up fault processing routine 110, where the failing module will set fail 112 and not ready 116 discretes.

The bridge in backplane 12 is capable of re-configuring from system controller (normally reserved for slot 1) to a non-system controller 98 located in slot n (n being the slot number of the last module in backplane 1 plus one) prior to interconnecting of the backplanes 27. Before backplanes can be connected, both bridges monitor each others fail 94 and ready 96 discrete signals. If both primary and secondary bridges pass self-test 38 and signal with ready discrete 92, then, secondary bridge 100 will reconfigure as a non-system controller 98. Secondary bridge 16 will then connect VMEbus 14 to interconnect bus 18. Primary bridge 12 will remain system controller 100 and will connect VMEbus 10 to interconnect bus 18. If either bridge signals a fail 112 or a response timeout occurs waiting for a valid ready/fail status from the other bridge module 114, then the primary and secondary VMEbusses remain isolated and the system enters a degraded mode of operation 108.

After both bridges 12 and 16 have connected the VMEbusses together 10 and 14 via interconnect bus 18, additional VMEbus tests are performed between bridges 102, and if these test pass 104 then the system enters normal operation 106. If the bridge-to-bridge VMEbus test fails 104, then either one or both bridge modules 12 and 16 disconnect VMEbusses 10 and 14 from interconnect bus 18 isolating primary from secondary VMEbus. Primary bridge 12 enters degraded mode of operation 108.

Figure 6:
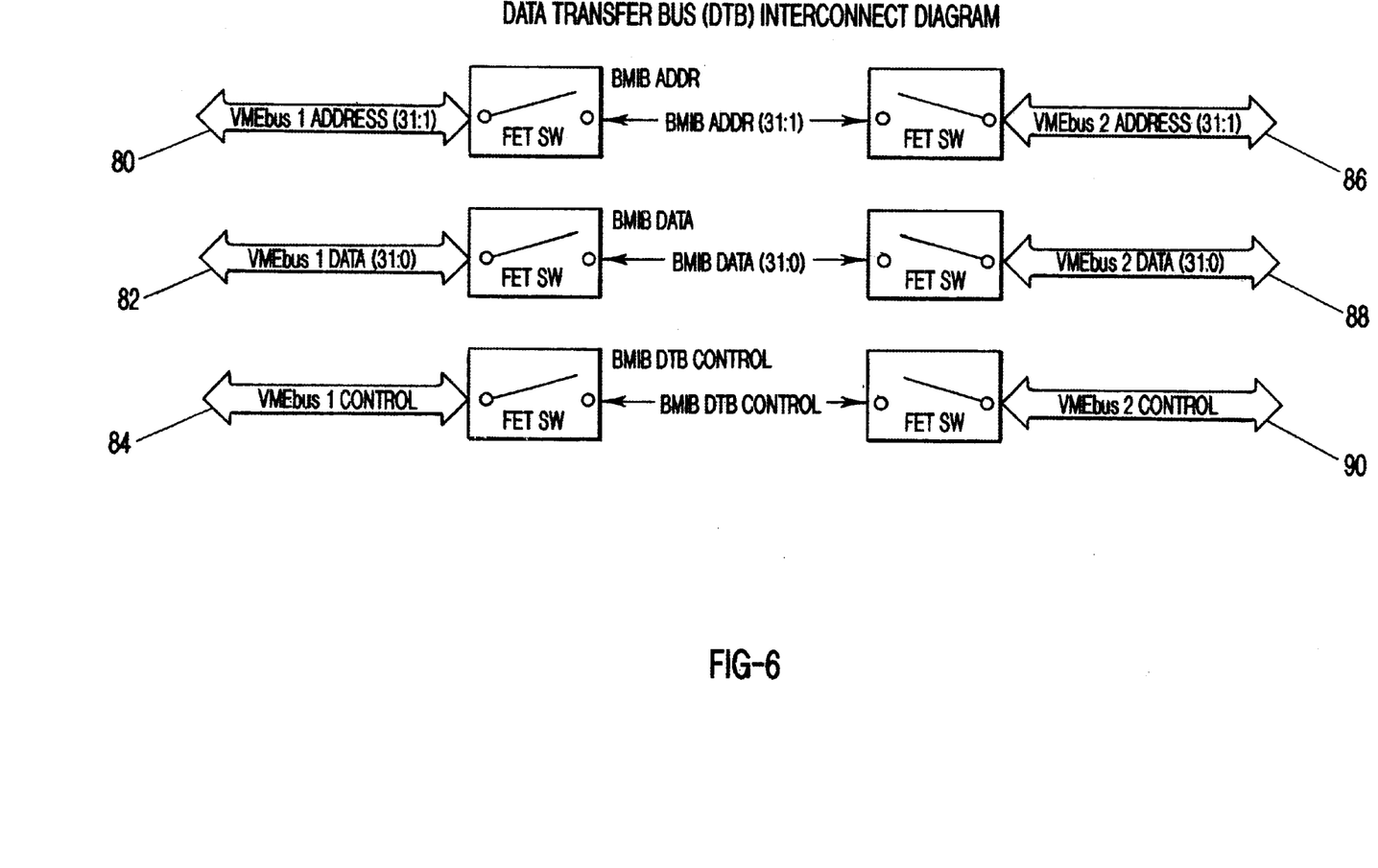
FIG. 6 is a diagram of the data transfer bus interconnect in accordance with the present invention.

The VMEbus includes three different busses, as shown in FIG. 4; data transfer bus 48, arbitration bus 50, and priority interrupt bus 52. Bridge modules 12 and 16 are responsible for interconnecting each one of these busses per the VME64 specifications. FIG. 6 shows how the data transfer bus is interconnected. The interconnect mechanism for the data transfer bus is a direct one-for-one connection between primary backplane 10 local VMEbus and interconnect bus 18 to the other VMEbus on secondary backplane 14. All address 80 and 86, data 82 and 88, and data transfer bus control signals 84 and 90 are directly coupled between the two (or more) backplanes via interconnect bus 18 located on bridge modules 12 and 16. In the event of a fault, either one or both of bridge modules 12 and 16 can disconnect the backplanes via the data transfer bus switches. The two backplanes can operate independently or as one virtual backplane depending on the configuration of the bridge modules by the end-user.

Figure 7:
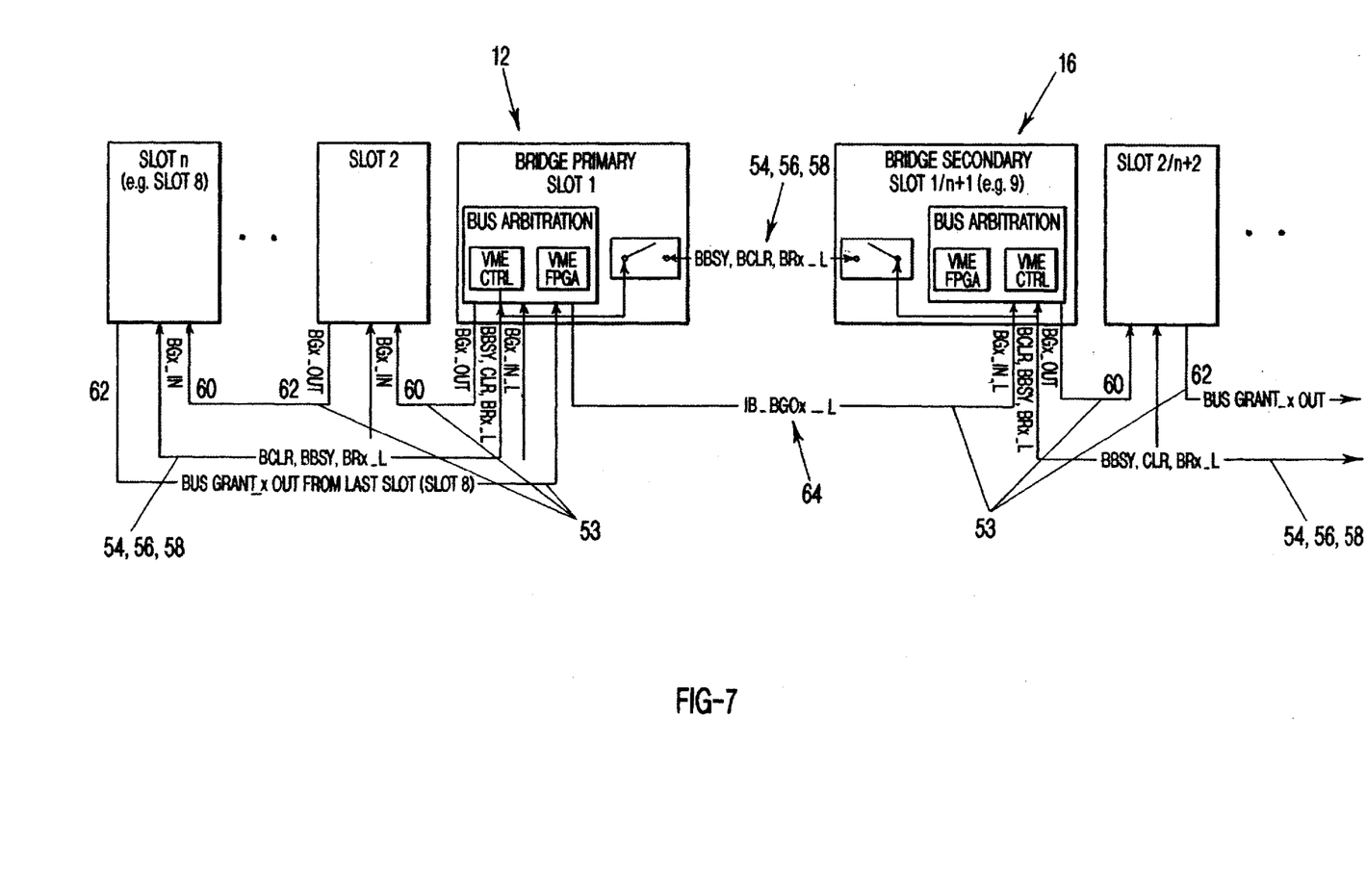
FIG. 7 is a diagram of the arbitration bus interconnect in accordance with the present invention.

FIG. 7 is a diagram of the arbitration bus interconnect. The VME arbitration bus is a combination daisy-chained 53 and bussed signals bus 54, 56, and 58. The arbitration bus is responsible for arbitrating the control of the data transfer bus (bus mastership) in a multiple master system as defined in the VME64 specifications. The arbitration bus request (BR0–3*) 54, bus clear (BCLR*) 56, and bus busy (BBSY*) 58, are bussed signals that are a direct one-for-one connection between primary backplane 10 VMEbus, interconnect bus 18, and secondary backplane 14 VMEbus. The arbitration bus daisy-chained signals 53, bus grant in 0–3 (BG0IN*–BG3IN*) 60 and bus grant out 0–3 (BG0OUT*–BG3OUT*) 62, require that the daisy-chained output signals (BG0OUT*-BG3OUT*) from the last module in primary backplane 10 be wrapped around and routed over to the bridge module 16 in secondary backplane 14. Bridge module 16 located in secondary backplane 14 (or #n) are in a non-system controller mode when the backplanes are interconnected. In this mode, bridge module 16 in secondary backplane 14 will take the wrapped bus grant output signals 64 from bridge module in primary backplane 10 (signals 54, 56, 58, and 64) as bus grant inputs to itself to be daisy-chained to following modules on secondary backplane 14.

Figure 8:
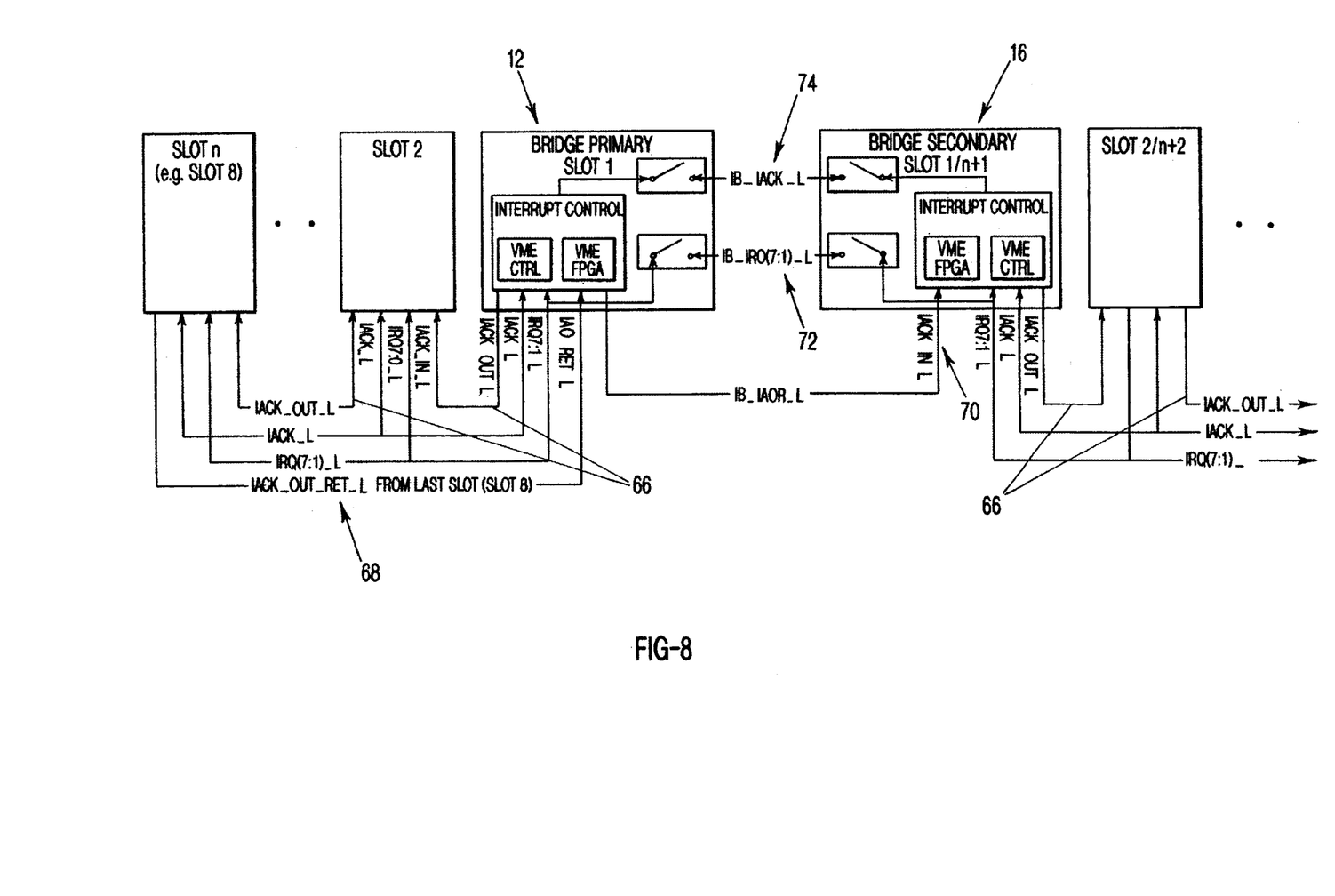
FIG. 8 is a diagram of the priority interrupt bus interconnect in accordance with the present invention.

FIG. 8 shows a diagram of how the priority interrupt bus is interconnected in this fault-tolerant backplane design. The priority interrupt bus is also a daisy-chained/bussed signal bus 66, similar to the arbitration bus. The output, IACK__

OUT 68, must be wrapped around from the last module in primary backplane 10 and routed to the IACK_IN 70 of slot 1 of secondary backplane 14 interconnect mechanism for the priority interrupt bus. The bussed signals, interrupts 1–7 (IRQ1*–IRQ7*) 72 and interrupt acknowledge (IACK*) 74 are direct one-for-one connection between primary backplane 10 VMEbus, interconnect bus, and secondary backplane 14 VMEbus.

Other variations and modifications of the present invention will be apparent to those of skill in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention can involve components having different characteristics as long as the principle, the presentation of a Fault Tolerant Virtual VMEbus Backplane Design, is followed. It is intended that the scope of the present invention be defined by the claims appended hereto.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

The embodiments of an invention in which an exclusive property or right is claimed are defined as follows:

1. A fault tolerant virtual VMEbus backplane for computer systems the apparatus comprising:
    at least two VMEbus backplanes, each VMEbus backplane comprising power supply and a fault detection apparatus; and
    at least two bridge modules, each bridge module comprising a switch for connecting and disconnecting each of said VMEbus backplanes.

2. The invention of claim 1 wherein said at least two VMEbus backplanes comprise a monolithic structure.

3. The invention of claim 1 wherein said fault detection apparatus comprises a fail discrete in said each bridge module.

4. The invention of claim 1 wherein said fault detection apparatus comprises fail discretes in preselected modules connected to said each VMEbus backplane.

5. The invention of claim 1 wherein said fault detection apparatus comprises a means to detect a fault in said each VMEbus backplane and a transmitter for transmitting said fault signal to a next VMEbus backplane.

6. The invention of claim 5 wherein said faults comprise module fail discretes and VMEbus backplane communication tests.

7. The invention of claim 6 wherein said VMEbus backplane communication tests comprise a data transfer bus test, an arbitration bus test, and a priority interrupt bus test.

8. The invention of claim 1 wherein said at least two bridge modules comprise a means to connect said VMEbus backplanes to appear as a single VMEbus backplane.

9. The invention of claim 8 wherein said means to connect said VMEbus backplanes to appear as a single VMEbus backplane comprises direct connections between said at least two VMEbus backplanes.

10. The invention of claim 1 further comprising a means to minimize data transmission latency delays between the at least two VMEbus backplanes.

11. The invention of claim 10 wherein the means to minimize data transmission latency delays between the at least two VMEbus backplanes comprises a direct connection between the at least two VMEbus backplanes.

12. A method of interconnecting and disconnecting at least two computer systems, a first computer system comprising a first VMEbus backplane and a next computer system comprising a next VMEbus backplane, the method comprising the steps of:
    a) detecting a fault status in the first and the next computer system;
    b) transmitting the fault status to the other computer system;
    c) connecting the first VMEbus backplane to the next VMEbus backplane if no faults are detected;
    d) disconnecting the first VMEbus backplane from the next VMEbus backplane if a fault is detected;
    e) operating in primary mode if the fault is detected in the next VMEbus backplane; and
    f) operating in fail safe mode if the fault is detected in the first VMEbus backplane.

13. The method of claim 12 wherein the steps of transmitting fault status to the other computer system and connecting the first VMEbus backplane to the next VMEbus backplane if no faults are detected comprise setting fail discretes to be detected by the other computer system before connecting the first VMBbus backplane to the next VMEbus backplane.

14. The method of claim 12 further comprising the step of minimizing data transmission latency delays between the first computer system and the next computer system.

15. A method of interconnecting a first VMEbus backplane and a second VMEbus backplane in a computer system wherein the first VMEbus backplane is connected to a primary bridge and the second VMEbus backplane is connected to a secondary bridge, the method comprising the steps of:
    a) testing the first VMEbus backplane and the second VMEbus backplane for faults;
    b) transmitting a fault/ready signal from the primary bridge and the secondary bridge;
    c) if the primary and secondary bridge both transmit the ready signal, connecting the first VMEbus backplane to the second VMEbus backplane and operating in a normal mode; and
    d) if the fault signal is transmitted in step b) isolating the first VMEbus backplane from the second VMEbus backplane and operating in a degraded mode.

16. The invention of claim 15 wherein the step of testing the first VMEbus backplane and the second VMEbus backplane for faults comprises initiating self tests upon power-up.

17. The method of claim 15 wherein the step of testing the first VMEbus backplane and the second VMEbus backplane for faults comprises testing in the primary bridge and the secondary bridge.

18. The method of claim 15 wherein the step of connecting the first VMEbus backplane to the secondary VMEbus backplane further comprises the step of configuring the first VMEbus backplane as a system controller and configuring the second VMEbus as a non-system controller.

19. The method of claim 15 wherein the step of connecting the first VMEbus backplane to the second VMEbus backplane comprises connecting the first VMEbus backplane to the second VMEbus backplane with one-for-one connections.

20. The method of claim 19 wherein the step connecting the first VMEbus backplane to the second VMEbus backplane with one-for-one connections comprises connecting the first VMEbus backplane to the second VMEbus backplane so they appear as a single VMEbus backplane.

21. The method of claim 15 wherein the step of isolating the first VMEbus backplane from the second VMEbus backplane and operating in a degraded mode further comprises making the second VMEbus backplane the system controller if the fault signal is transmitted by the primary bridge.

22. The method of claim 16 wherein the steps of connecting the first VMEbus backplane to the second VMEbus backplane and isolating the first VMEbus backplane from the secondary VMEbus backplane comprise decision making logic resident in the primary bridge and the secondary bridge.

* * * * *